United States Patent
Nakamura et al.

(10) Patent No.: US 7,016,519 B1
(45) Date of Patent: Mar. 21, 2006

(54) METHOD AND DEVICE FOR DETECTING THREE-DIMENSIONAL INFORMATION

(75) Inventors: Haruhito Nakamura, Shizuoka (JP); Tahito Aida, Tokyo (JP); Masahiro Kawakita, Tokyo (JP); Keigo Iizuka, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/418,441

(22) Filed: Oct. 15, 1999

(30) Foreign Application Priority Data

Oct. 15, 1998 (JP) ................................. 10-293817

(51) Int. Cl.
*G06K 9/00* (2006.01)
(52) U.S. Cl. ...................... 382/106; 382/154; 356/5.04
(58) Field of Classification Search ............... 382/106, 382/154; 350/5.03, 5.04, 602, 610; 250/559.22, 250/559.23, 559.31, 559.38, 201.6
See application file for complete search history.

(56) References Cited

U.S. PATENT DOCUMENTS

| | | | | | |
|---|---|---|---|---|---|
| 4,935,616 | A | * | 6/1990 | Scott | 250/213 |
| 5,216,259 | A | * | 6/1993 | Stern et al. | 250/561 |
| 5,694,203 | A | * | 12/1997 | Ogawa | 56/5.04 |
| 6,057,909 | A | * | 5/2000 | Yahav et al. | 356/5.04 |

FOREIGN PATENT DOCUMENTS

JP    06-294868 A   * 10/1994

* cited by examiner

*Primary Examiner*—Brian P. Werner
(74) *Attorney, Agent, or Firm*—Sughrue Mion, PLLC

(57) ABSTRACT

An image of an object illuminated by illumination light having given intensity is formed as an optical image. The distance between respective points of the object is determined on the basis of a video which is obtained by acquiring the optical image with a given image pick-up gain. Here, either the intensity of the illumination light or the image pick-up gain is changed with time. The distribution of intensity of the image acquired by utilization of such intensity or image pick-up gain reflects a time lag between the time at which the illumination light is emitted from a light source and the time at which the light reflected from individual points of the object reaches an image pick-up device. The distribution of intensity includes information pertaining to the distance between the light source and the respective points of the object.

8 Claims, 13 Drawing Sheets

--PRIOR ART--

METHOD AND DEVICE FOR DETECTING THREE-DIMENSIONAL INFORMATION

FIELD OF THE INVENTION

The present invention relates to a method and apparatus for detecting three-dimensional information pertaining to an object which can be applied to acquisition of a three-dimensional image, and more particularly, to a method and device which detects three-dimensional information pertaining to an object by two-dimensionally measuring the distance between points of the object at a speed at which the three-dimensional information can be followed in real time within a period relating to a frame of a video signal (hereinafter referred to simply as a "frame period").

PRIOR ART

The following methods have conventionally been employed as techniques for measuring the distance between an object and an image acquisition device or three-dimensional information through use of light.

(1) As shown in FIG. 12, a pulse laser beam or a laser beam whose amplitude is modulated by a sinusoidal wave is radiated onto an object, and the distance between the object and the laser is measured on the basis of a period of time during which reflected light returns to the laser or a modulated phase of the reflected light.

(2) As shown in FIG. 13, under the method (1), the distance between the respective points of an object is two-dimensionally measured by two-dimensionally scanning the laser beam over the object.

(3) As shown in FIG. 14, illumination light is modulated by a sinusoidal signal, and a light amplification gain of an image intensifier disposed in front of an image pick-up element is modulated through use of the sinusoidal signal. An optical image formed by collecting light reflected from the object through use of a lens includes a modulated phase corresponding to the distance between the object and the lens. Of an optical image input to the image intensifier, only a portion of the image whose phase matches a change in the light amplification gain is emphasized. As a result, the points of the object equidistantly spaced away from the lens can be two-dimensionally captured in the form of contour lines. The principle behind the third method is described in detail in Japanese Patent Application Laid-Open No. Hei-6-294868 entitled "Imaging Laser Radar Device."

Problem To Be Solved By The Invention

According to the method described in connection with (1), the distance between a single point of the object and the laser is measured, and hence three-dimensional information pertaining to the object cannot be produced. In order to acquire three-dimensional information by measuring two-dimensional distribution of the distance among the respective points of the object, the light beam must be moved so as to two-dimensionally scan the object as mentioned in the method (2). Alternatively, according to method (3), since only portions of the object equidistantly spaced away from the lens are extracted, the modulated phase of illumination light must be changed to only a required extent in order to acquire three-dimensional information pertaining to the entirety of the object. Methods (2) and (3) require two-dimensional raster-scanning of an illumination light beam and a change in the modulated phase of the illumination light. Therefore, under these methods, acquiring three-dimensional information pertaining to the object at a speed equal to the frame period of a video signal is difficult. Therefore, the methods are not suitable for acquiring a three-dimensional image.

The object of the present invention is to provide a method and device which solve the problem of the conventional technique, are suitable for acquiring a three-dimensional image, and enable detection of three-dimensional information pertaining to an object within a period of time corresponding to the frame of a video signal.

SUMMARY

A three-dimensional information detecting method of the present invention comprises steps of: forming an image of an object illuminated by illumination of the modulated light having given intensity as an optical image, and detecting the distance between individual points of the object on the basis of an image obtained by acquisition of the optical image with a given image pick-up gain. Under this method, either the given intensity or the image pick-up gain is changed with time, and the distance between respective points of the object can be detected at a speed at which the three-dimensional information can be followed real time within a period of time corresponding to the frame of a video signal. By utilization of the intensity or image pick-up gain which is changed with time, the two-dimensional distribution of intensity of light including information pertaining to the distance between the respective points of the object is acquired. Accordingly, the distance between respective points of the object can be determined on the basis of the intensity level information, whereby three-dimensional information pertaining to the object can be detected.

The image of the object can be acquired a plurality of times within the period of time corresponding to one frame of the video signal. In such a case, a signal-to-noise ratio (S/N) is improved by means of the storage effect of the image pick-up element, and the image pick-up intensity is enhanced.

A device for detecting three-dimensional information of the present invention comprises a projection section capable of projecting illumination light having given intensity on an object; an image pick-up section capable of acquiring an image of the object with a given image pick-up gain; and a signal processing section which calculates the distance between respective points of the object on the basis of intensity level information included in a video signal output from the image pick-up section. Either the given intensity or the image pick-up gain is changed with time, and the distance between respective points of the object can be detected at a speed at which the three-dimensional information can be followed real time within a period of time corresponding to the frame of a video signal. By utilization of the intensity or image pick-up gain which is changed with time, the two-dimensional distribution of intensity of the image of the object that is acquired by the image pick-up section includes information pertaining to the distance between the respective points of the object. Accordingly, the signal processing section can calculate the distance between respective points of the object on the basis of the intensity level information. The device can acquire an image of the object within a sufficiently short period of time. So long as the signal processing section can compute the distance between respective points of the object at sufficient speed, the distance between respective points of the object can be detected at a speed at which the three-dimensional information can be followed within a period of time corresponding to the frame of a video signal.

BRIEF DESCRIPTION OF THE DRAWINGS

FIG. 2 is an illustration for describing a method of detecting three-dimensional information by utilization of illumination light which linearly increases and has given intensity and a pulse-like image pick-up gain in combination, wherein FIG. 2A shows a time-varying waveform determined by the intensity I of illumination light and an image pick-up gain "g," and FIG. 2B shows a time-varying waveform determined by the image pick-up gain "g" and the intensity $I_R$ of light reflected from an object spaced away from a projection section by only distance "d";

FIG. 3 is an illustration for describing a method of detecting three-dimensional information by utilization of illumination light which linearly decreases and has given intensity and a pulse-like image pick-up gain in combination, wherein FIG. 3A shows a time-varying waveform determined by the intensity I of illumination light and an image pick-up gain "g," and FIG. 3B shows a time-varying waveform determined by the image pick-up gain "g" and the intensity $I_R$ of light reflected from an object spaced away from a projection section by only distance "d";

FIG. 4 is an illustration for describing a method of detecting three-dimensional information by utilization of illumination light which linearly increases and decreases and has given intensity and a pulse-like image pick-up gain in combination, wherein FIG. 4A shows a time-varying waveform determined by the intensity I of illumination light and an image pick-up gain "g," and FIG. 4B shows a time-varying waveform determined by the image pick-up gain "g" and the intensity $I_R$ of light reflected from an object spaced away from a projection section by only distance "d";

FIG. 5 is an illustration for describing a method of detecting three-dimensional information by utilization of a given image pick-up gain which linearly increases and illumination light having pulse-like intensity in combination, wherein FIG. 5A shows a time-varying waveform determined by the intensity I of illumination light and an image pick-up gain "g," and FIG. 5B shows a time-varying waveform determined by the image pick-up gain "g" and the intensity $I_R$ of light reflected from an object spaced away from a projection section by only distance "d";

FIG. 6 is an illustration for describing a method of detecting three-dimensional information by utilization of a given image pick-up gain which linearly decreases and illumination light having a pulse-like intensity in combination, wherein FIG. 6A shows a time-varying waveform determined by the intensity I of illumination light and an image pick-up gain "g," and FIG. 6B shows a time-varying waveform determined by the image pick-up gain "g" and the intensity $I_R$ of light reflected from an object spaced away from a projection section by only distance "d";

FIG. 7 is an illustration for describing a method of detecting three-dimensional information by utilization of a given image pick-up gain which linearly increases and decreases and illumination light having pulse-like intensity in combination, wherein FIG. 7A shows a time-varying waveform determined by the intensity I of illumination light and an image pick-up gain "g," and FIG. 7B shows a time-varying waveform determined by the image pick-up gain "g" and the intensity $I_R$ of light reflected from an object spaced away from a projection section by only distance "d";

DESCRIPTION OF THE REFERENCE NUMERALS

1 . . . signal generation section, 4 . . . lens, 5 . . . image intensifier with gating operation, 6 . . . image pick-up element, 7 . . . signal processing section, 10 . . . projection section, 11 . . . image pick-up section, 20 . . . optical image transfer optical system, 21 . . . gate, 22 . . . image split circuit, 30 . . . illumination optical system, 31 . . . light-emitting element, 32 . . . external modulator

DETAILED DESCRIPTION OF PREFERRED EMBODIMENTS

Figure 1:
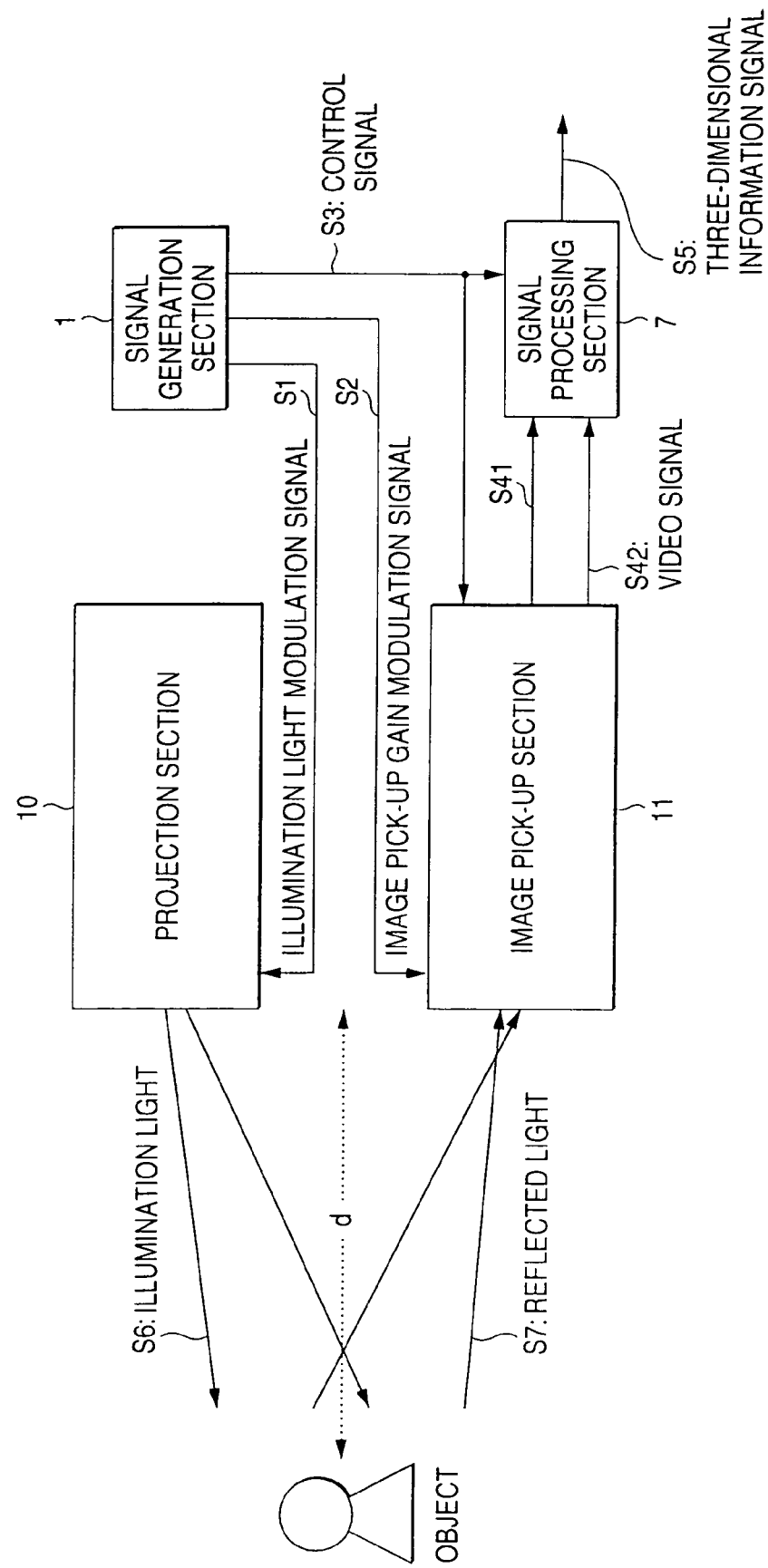
FIG. 1 is a schematic diagram showing the configuration of a three-dimensional information detecting device according to a first embodiment of the present invention.

Various embodiments of the present invention will be described hereinbelow by reference to the accompanying drawings. FIG. 1 is a schematic diagram showing a three-dimensional information detecting device according to a first embodiment of the present invention. The device comprises a projection section 10 capable of illuminating an object with illumination light S6 whose amplitude is modulated; an image pick-up section 11 which receives light S7 reflected from the object while changing an image pick-up gain with time and captures an optical image of the object; a signal processing section 7 for converting video signals S41 and S42 output from the image pick-up section 11 into a three-dimensional information signal S5; and a signal generation section 1 which produces an illumination light modulation signal S1, an image pick-up modulation signal S2, and a control signal S3. The specific configuration of these constituent elements will be described later.

The principle behind the three-dimensional information detecting method of the present invention which uses the device shown in FIG. 1 will be described by reference to a specific example in which the intensity of the light source or an image pick-up gain is linearly changed with time.

Figure 2:
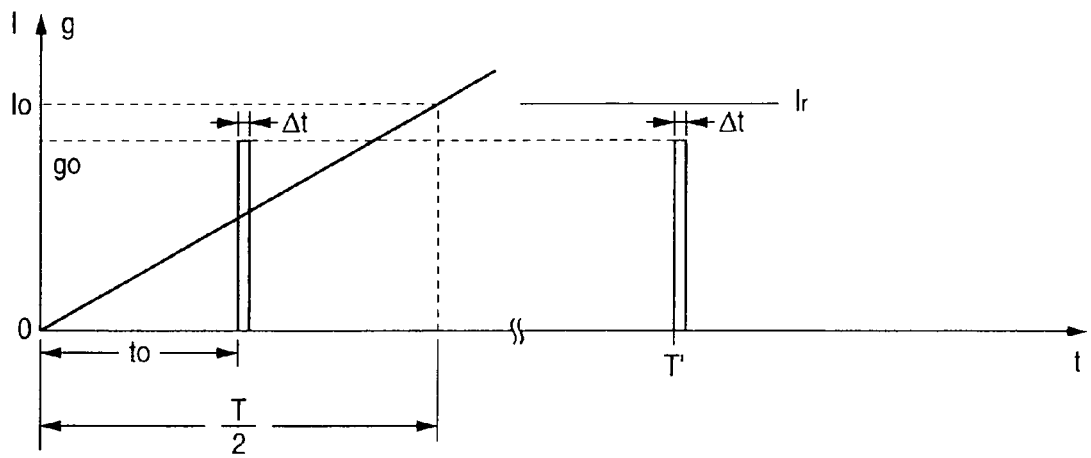
Figure 2:
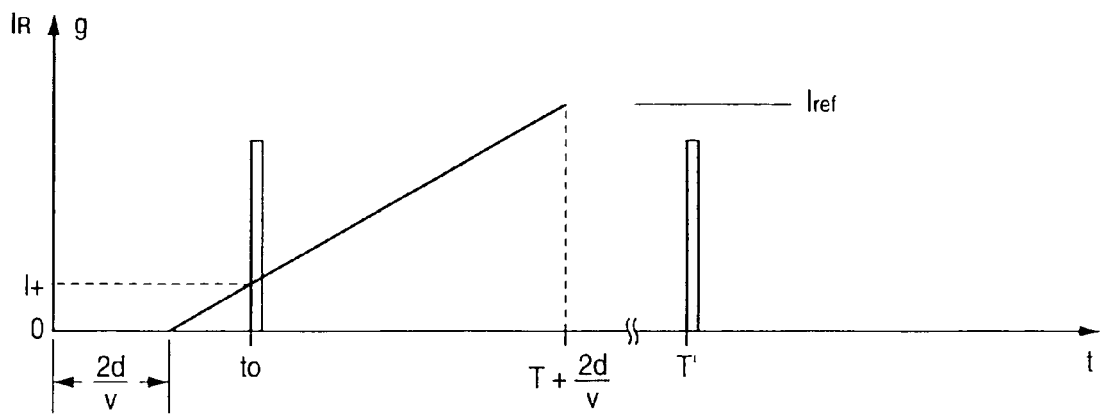
Figure 3:
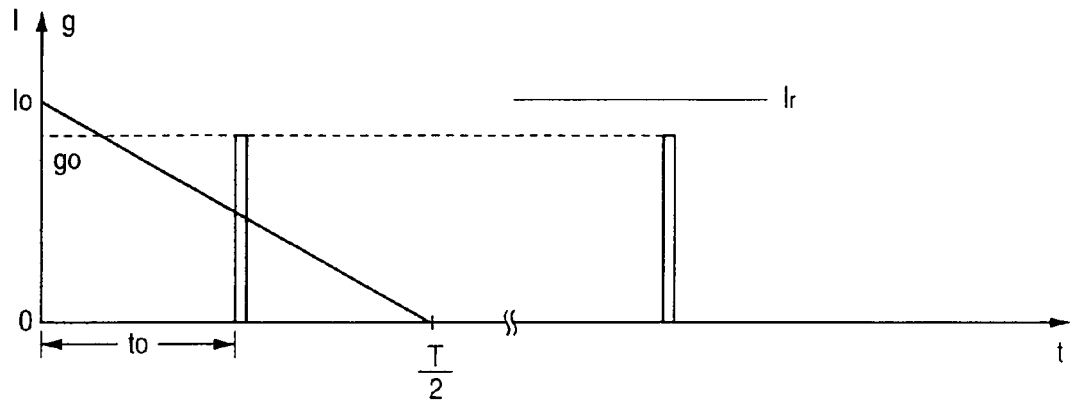
Figure 3:
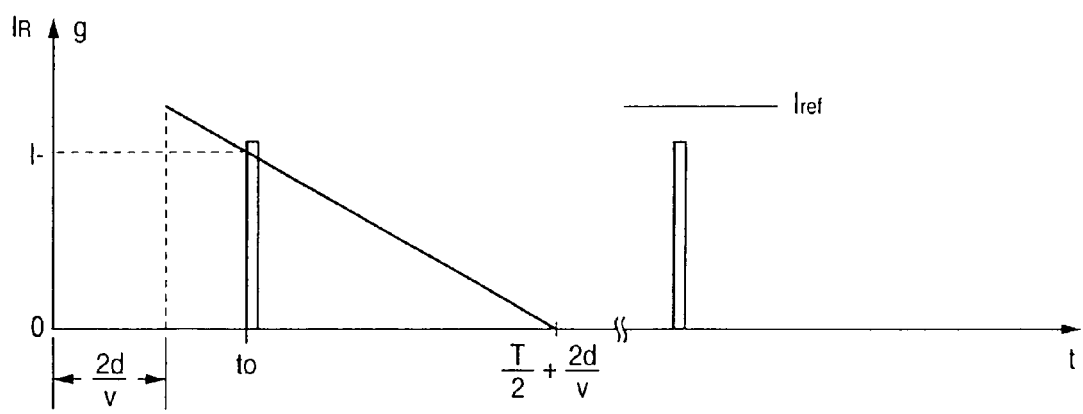

The three-dimensional information detecting method according to a first embodiment of the present invention will be described by reference to FIGS. 2 and 3. As shown in FIG. 2A, the intensity I of illumination light is subjected to amplitude modulation, to thereby obtain I=St, where "t" represents time and "S" represents the rate of increase in intensity (=$2I_0/T$). As shown in FIG. 2B, the intensity $I_R$ of light reflected from the object which is spaced by only distance "d" away from an exit of the projection section 10 is changed, as specified by S(t−2d/v), with a delay equal to a duration of time during which light travels between the projection section and the object (=2d/v, where "v" represents light speed). If reflected light having intensity $I_+$ at certain time $t=t_0$ is acquired for only a short period of time $\Delta t$ (<<T) while an image pick-up gain "g" is taken as $g=g_0$ (>0), the intensity $I_+$ of the resultant image is expressed by Equation (1).

$$I_+ g_0 = \frac{\sigma}{(4\pi d^2)^2} g_0 S(t_0 - 2d/v) \tag{1}$$

where $\sigma$ represents the area of the backward scattering cross-section of an object. Equation (1) includes information pertaining to the distance between the object and the three-dimensional information detecting device. In order to eliminate the dependency of term $\sigma/(4\pi d^2)^2$, the second image of the object is acquired while the intensity I of illumination light is uniformly maintained at $I=I_r$ for a short period of time $\Delta t$ from time T'. At this time, luminous intensity $I_{ref}g_0$ is expressed by Equation (2).

$$I_{ref} g_0 = \frac{\sigma}{(4\pi d^2)^2} g_0 I_r \tag{2}$$

The following equation is derived from Equations (1) and (2).

$$R_+ = \frac{I_+ g_0}{I_{ref} g_0} = \frac{S(t_0 - 2d/v)}{I_r} \tag{3}$$

From Equation (3), we have $$d = \frac{1}{2} v \left( t_0 - \frac{I_r}{S} R_+ \right). \tag{4}$$

Further, let $I_r = I_0$; then $$d = \frac{1}{2} v \left( t_0 - \frac{T}{2} R_+ \right). \tag{5}$$

From Equation (4) or (5), we have distance "d."

As mentioned above, the intensity of respective points of an optical image formed by collection of the light reflected from the object exposed to amplitude-modulated light includes information pertaining to the distance between the three-dimensional information detecting device and a corresponding point of the object. So long as the object is captured in the manner as mentioned above and Equation (4) or (5) is applied to the intensity of each of the pixels of the image, information pertaining to the distance between the respective points of the object are two-dimensionally obtained, whereby three-dimensional information pertaining to the object can be detected.

As shown in FIGS. 3A and 3B, even when the intensity I of the light source diminishes, as specified by $I=I_0-St$, the distance "d" can be obtained in the same manner as mentioned previously.

$$I_- g_0 = \frac{\sigma}{(4\pi d^2)^2} g_0 \{I_0 - S(t_0 - 2d/v)\} \tag{6}$$

$$R_- = \frac{I_- g_0}{I_{ref} g_0} = \frac{I_0 - S'(t_0 - 2d/v)}{I_r} \tag{7}$$

$$d = \frac{1}{2} v \left( t_0 - \frac{I_0 - I_r R_-}{S} \right) \tag{8}$$

Further, let $I_r = I_0$; then $$d = \frac{1}{2} v \left\{ t_0 - \frac{T}{2}(1 - R_-) \right\}. \tag{9}$$

As in the case of the previous example, the optical image formed by collection of light reflected from the object. So long as Equation (8) or (9) is applied to each of the pixels of the image, information pertaining to the distance between the respective points of the object are two-dimensionally obtained, whereby three-dimensional information pertaining to the object can be obtained.

Figure 4:
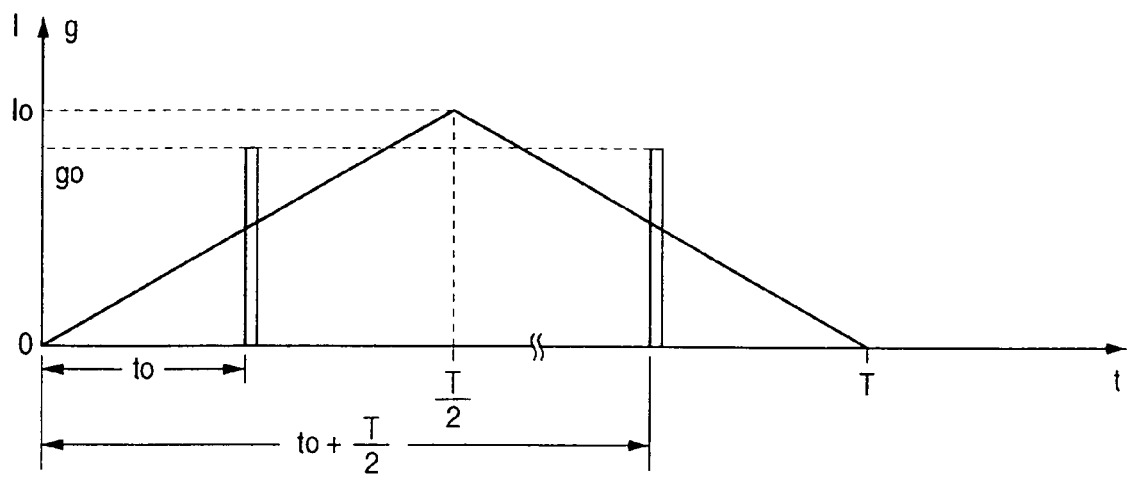
Figure 4:
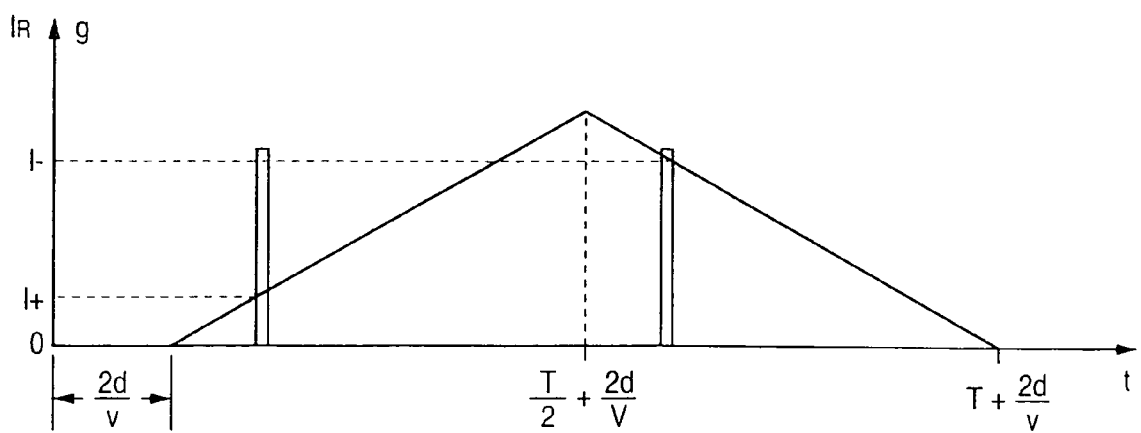

Referring to FIG. 4, a three-dimensional information detecting method according to a second embodiment of the present invention will now be described. As shown in FIG. 4, the object is illuminated while the intensity of illumination light is modulated by employment of a triangular waveform. An optical image of reflected light is acquired twice; in other words, an optical image of reflected light whose intensity is $I_+$ is acquired at time $t=t_0$ for only a short period of time $\Delta t$ (<<T) with an image pick-up gain $g=g_0$ (>0), and an optical image of reflected light whose intensity is $I_-$ is acquired at time $t=t_0+T/2$ for only a short period of time $\Delta t$ (<<T) with the image pick-up gain $g=g_0$(>0). From Equations (1) and (6), we have $$R = \frac{I_+ g_0}{I_- g_0} = \frac{S(t_0 - 2d/v)}{I_0 - S(t_0 - 2d/v)} \tag{10}$$

$$d = \frac{1}{2} v \left\{ t_0 - \frac{I_0}{S} \left( \frac{R}{1+R} \right) \right\}. \tag{11}$$

Let the wavelength of illumination light modulated by a triangular waveform be defined as $\lambda = vT$; then from $S = I_0/(T/2)$, we have $$d = \frac{1}{2} v t_0 - \frac{\lambda}{4} \left( \frac{R}{1+R} \right). \tag{12}$$

Further, if $t_0$ is set to a given value, distance "d" can be expressed as a relative distance with reference to a reference point $d_{ref}$. Equation (13) represents a relative distance with reference to $d_{ref} = 0$ when $t_0 = T/4$.

$$d = \frac{\lambda}{8} \left( \frac{1-R}{1+R} \right) \tag{13}$$

As in the case of the first embodiment, the optical image is formed by collection of light reflected from the object. So long as any one of Equations (11), (12), and

(13) is applied to each of the pixels of the image, information pertaining to the distance between the respective points of the object are two-dimensionally obtained, whereby three-dimensional information pertaining to the object can be obtained.

According to a method which is complementary to the three-dimensional information detecting methods described in connection with the first and second embodiments, three-dimensional information pertaining to an object can be detected by capturing the image of the object with an image pick-up gain, which linearly increases or decreases, through use of illumination light modulated in the form of a pulse for a short period of time.

Figure 5:
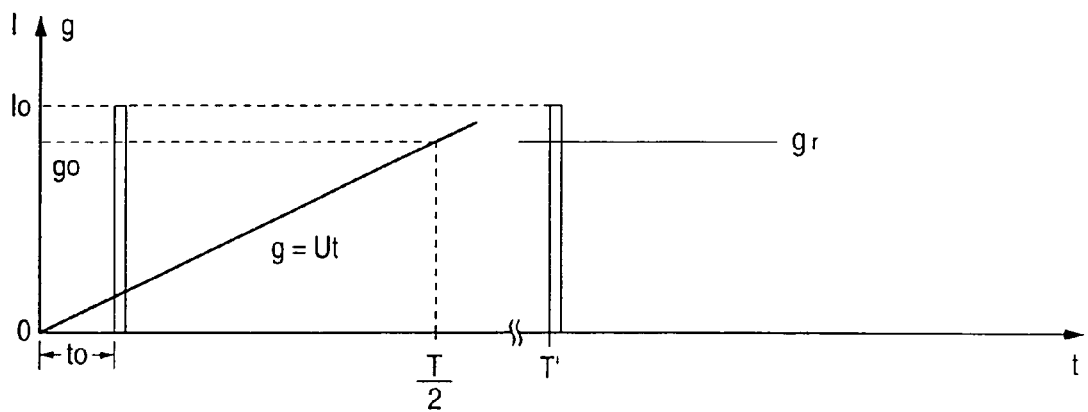
Figure 5:
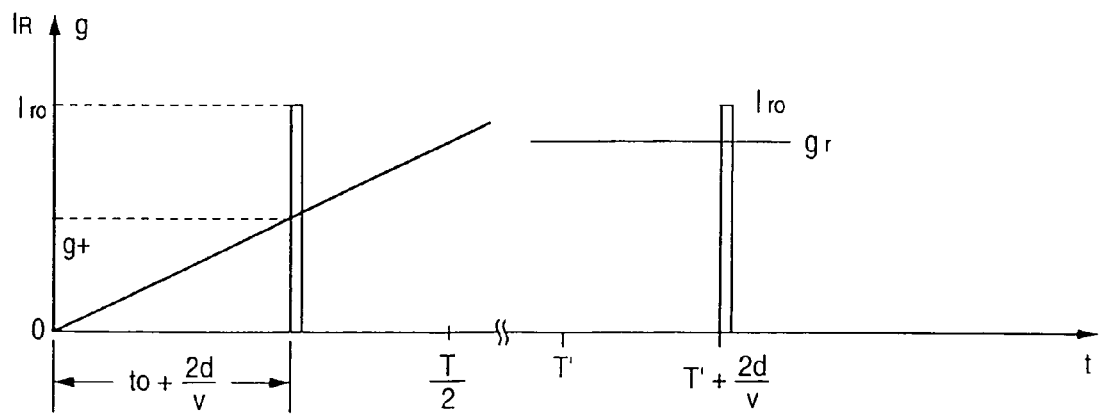
Figure 6:
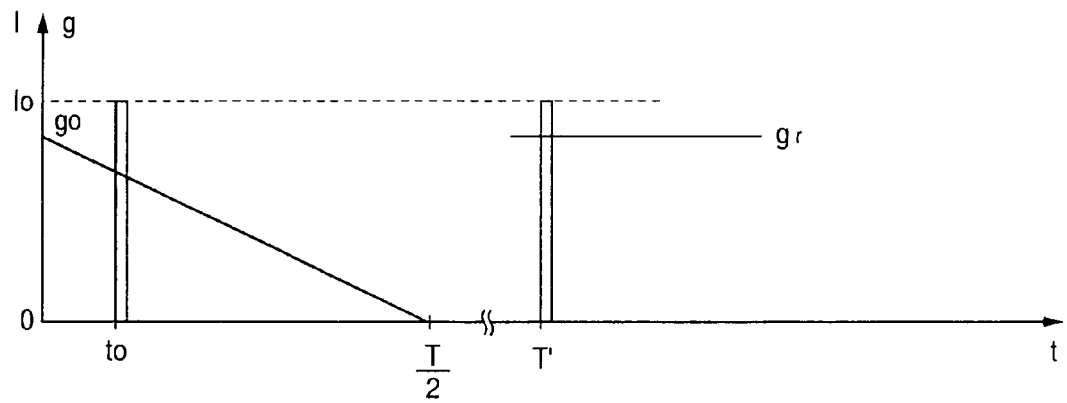
Figure 6:
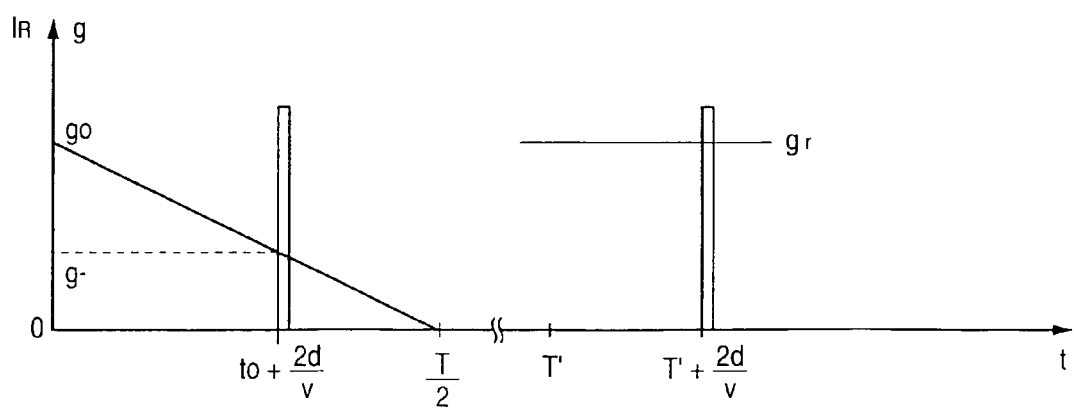

A three-dimensional information detecting method according to a third embodiment of the present invention will be described by reference to FIGS. 5 and 6. As shown in FIG. 5A, illumination light is modulated such that an image pick-up gain "g" is linearly increased (i.e., g=Ut). Further, an object is exposed to light which illuminates like a pulse with intensity I=$I_0$ for only a short period of time Δt (<<T). Here, U designates the rate of increase in image pick-up sensitivity (=$2g_0$/T). The image pick-up gain $g_+$ obtained when the light reflected from the object that is spaced only distance "d" from the three-dimensional information detecting device has returned to the image pick-up device becomes $g_+$=U($t_0$+2d/v). The intensity $I_{ro}g_+$ of an image resulting from the reflected light being captured is expressed by Equation (14).

$$I_{ro}g_+ = \frac{\sigma}{(4\pi d^2)^2} I_0 U(t_0 + 2d/v) \quad (14)$$

Further, in order to eliminate the dependency of term σ/$(4\pi^2)^2$, the object is illuminated for a short period of time Δt from time T' while the image pick-up gain "g" is uniformly maintained at g=$g_r$. At this time, luminous intensity $I_{ro}g_r$ is expressed by Equation (15).

$$I_{ro}g_r = \frac{\sigma}{(4\pi d^2)^2} I_0 g_r \quad (15)$$

The following equation is derived from Equations (14) and (15).

$$R_+ = \frac{I_{ro}g_+}{I_{ro}g_r} = \frac{U(t_0 + 2d/v)}{g_r} \quad (16)$$

From Equation (16), we have $$d = \frac{1}{2}v\left(-t_0 + \frac{g_r}{U}R_+\right) \quad (17)$$

Further, suppose $g_r$=$g_0$; the following expression is derived from U=$g_0$/(T/2).

$$d = \frac{1}{2}v\left(-t_0 + \frac{T}{2}R_+\right) \quad (18)$$

The distance "d" is derived from Equation (17) or (18). As in the case of the first and second embodiments, an optical image formed by collection of the light reflected from the object is captured. So long as Equation (17) or (18) is applied to the intensity of each of the pixels of the image, information pertaining to the distance between the respective points of the object are two-dimensionally obtained, whereby three-dimensional information pertaining to the object can be detected.

As shown in FIG. 6A, even when the image pick-up gain "g" decreases (g=$g_0$−Ut), the distance "d" can be obtained in the same manner as that employed previously.

$$I_{ro}g_- = \frac{\sigma}{(4\pi d^2)^2} I_0\{g_0 - U(t_0 + 2d/v)\} \quad (19)$$

$$R_- = \frac{I_{ro}g_-}{I_{ro}g_r} = \frac{g_0 - U(t_0 + 2d/v)}{g_r} \quad (20)$$

$$d = \frac{1}{2}v\left(-t_0 + \frac{g_0 - R_- g_r}{U}\right) \quad (21)$$

Further, let $g_r$=$g_0$; then $$d = \frac{1}{2}v\left\{-t_0 + \frac{T}{2}(1 - R_-)\right\} \quad (22)$$

As mentioned previously, an optical image formed by collection of the light reflected from the object is captured. So long as Equation (21) or (22) is applied to the intensity of each of the pixels of the image, information pertaining to the distance between the respective points of the object are two-dimensionally obtained, whereby three-dimensional information pertaining to the object can be detected.

Figure 7:
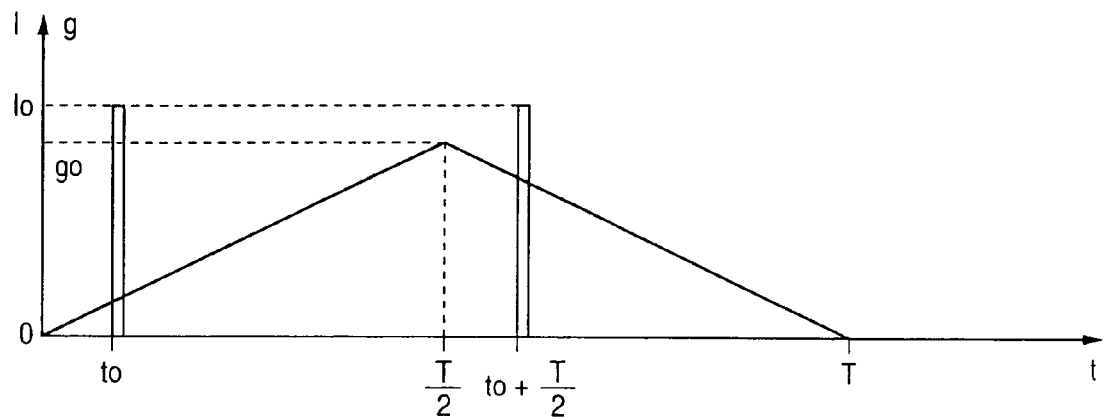
Figure 7:
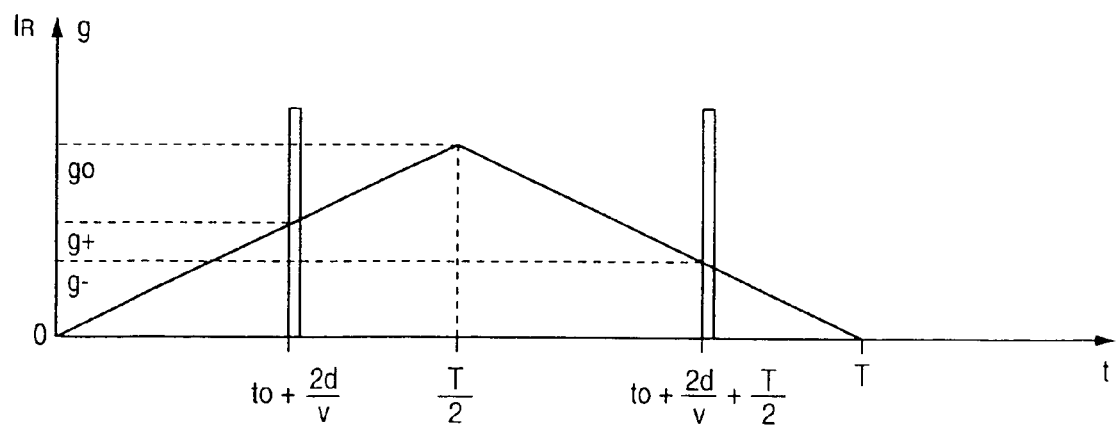

A three-dimensional information detecting method according to a fourth embodiment of the present invention will now be described by reference to FIGS. 7A and 7B. As shown in FIG. 7A, the image pick-up gain "g" is modulated through use of a triangular waveform, and an object is illuminated twice; in other words, an optical image is illuminated at time t=$t_0$ to through use of light which illuminates in a pulsating manner with intensity I=$I_0$ for only a period of time Δt (<<T), and an object is illuminated at time t=$t_0$+T/2 through use of light which illuminates in a pulsating manner with intensity I=$I_0$ for only a period of time Δt (<<T). From Equations (15) and (19), we have $$R = \frac{I_{ro}g_+}{I_{ro}g_-} = \frac{U(t_0 + 2d/v)}{g_0 - U(t_0 + 2d/v)} \quad (23)$$

$$d = \frac{1}{2}v\left\{-t_0 - \frac{g_0}{U}\left(\frac{R}{1+R}\right)\right\} \quad (24)$$

Suppose the wavelength of the triangular waveform used for modulating the image pick-up sensitivity is defined as λ=vT for convenience's sake, the following expression is derived from U=$g_0$/(T/2).

$$d = -\frac{1}{2}vt_0 - \frac{\lambda}{4}\left(\frac{R}{1+R}\right) \quad (25)$$

As in the case of the second embodiment, if $t_0$ is set to a given value, the distance "d" can be expressed as a relative distance with reference to the reference point $d_{ref}$. Equation (26) represents the relative distance with reference to $d_{ref}=0$ when $t_0=T/4$.

$$d = -\frac{\lambda}{8}\left(\frac{1-R}{1+R}\right) \quad (26)$$

As mentioned previously, an optical image formed by collection of the light reflected from the object is captured. So long as Equation (24), (25), or (26) is applied to each of the pixels of the image, information pertaining to the distance between the three-dimensional information detecting device and the respective points of the object are two-dimensionally obtained, whereby three-dimensional information pertaining to the object can be detected.

A method of increasing the image pick-up sensitivity in each of the previous embodiments will now be described. In the previously embodiments, acquisition of an image having intensity $I_+g_0$ and an image having intensity $I_{ref}g_0$ for the purpose of determining $R_+$, acquisition of an image having intensity I.g. and an image having intensity $I_{ref}g_0$ for the purpose of obtaining $R_-$, or acquisition of an image having intensity $I_+g_0$ and an image having intensity $I_-g_0$ for the purpose of determining R is performed a plurality of times within the period of time corresponding to one frame of an image signal. As a result, the signal-to-noise ratio (S/N) is improved by the storage effect of the image pick-up element used for acquiring an image, whereby the image pick-up sensitivity is improved.

The configuration of the three-dimensional information detecting device shown in FIG. 1 will now be described in detail by reference to the drawings.

Figure 8:
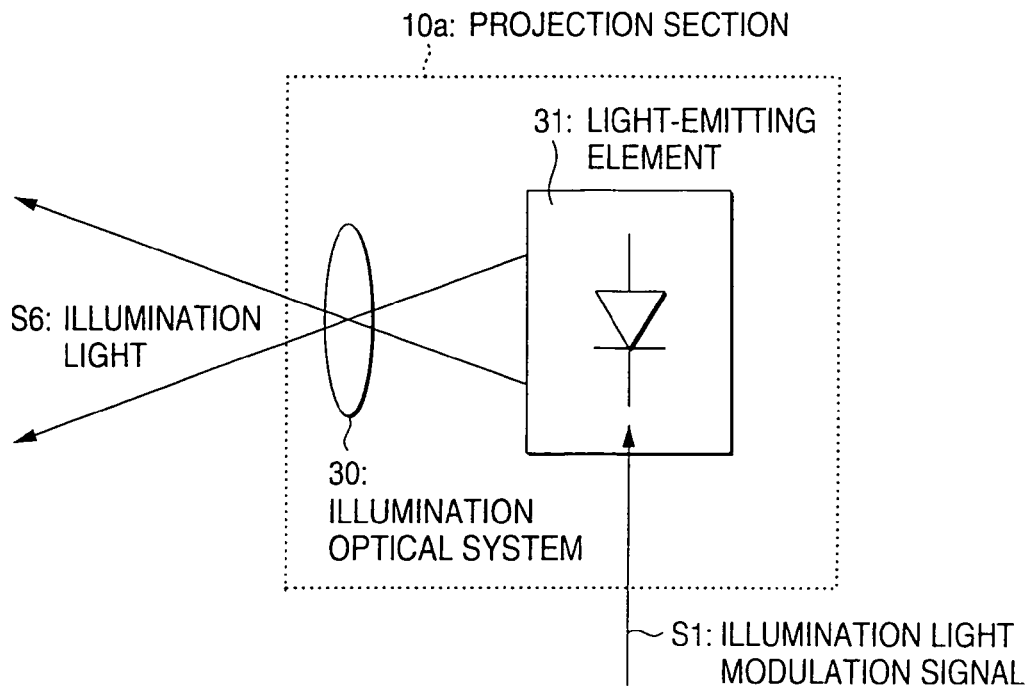
FIG. 8 is a schematic diagram showing the configuration of a projection section equipped with a light-emitting element whose light is directly modulated.

FIG. 8 shows a projection section 10a which is another embodiment of the projection section 10 shown in FIG. 1. The projection section 10a comprises a light-emitting element 31 whose light can be directly modulated by an illumination modulation signal S1, and an illumination optical system 30 which is disposed opposite the light exit surface of the light-emitting element 31, which shapes the light emitted from the light-emitting element 31, and which directs the light toward the object. For example, a semiconductor laser diode or a semiconductor light-emitting diode can be employed as the light-emitting element 31. When such a light-emitting element is activated directly by the illumination light modulation signal S1 which is an electric signal, the element can emanate light whose intensity is changed at high speed. The thus-produced light is shaped by means of an illumination optical system 30 so as to illuminate an object, whereby illumination light S6 is produced. Accordingly, illumination light whose intensity is arbitrarily changed at high speed, such as increment light, decrement light, or pulse-like light, can be realized by means of the illumination light modulation signal S1. As mentioned above, the projection section having the configuration shown in FIG. 8 can be used as means for controlling the intensity of illumination light under the three-dimensional information detecting method of the present invention.

Figure 9:
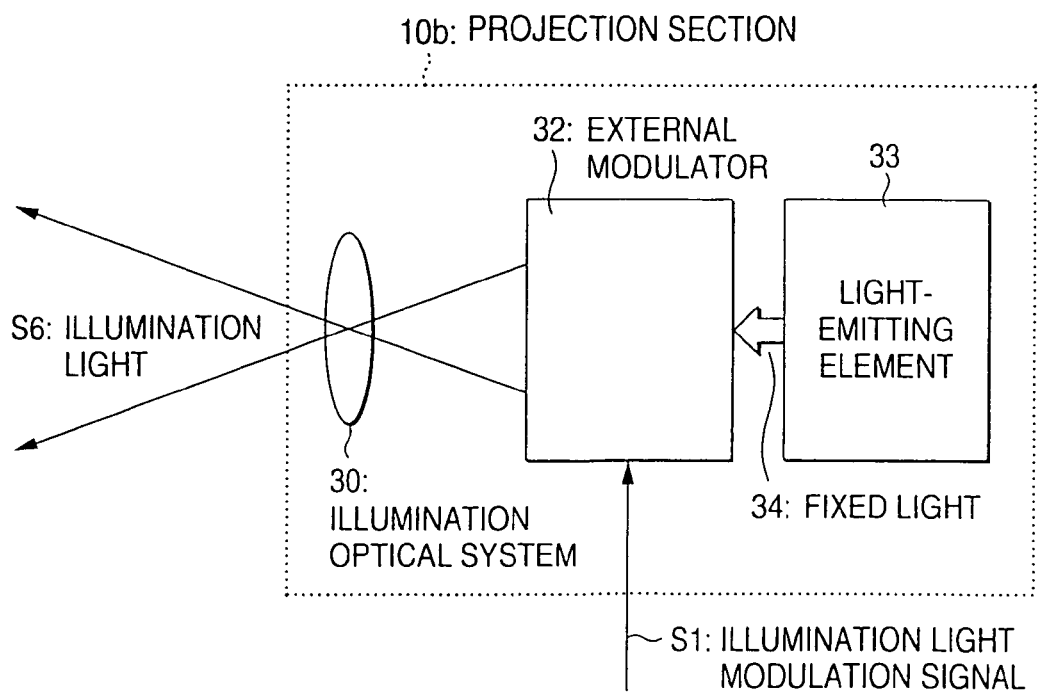
FIG. 9 is a schematic diagram showing the configuration of a projection section equipped with a light-emitting element whose light is indirectly modulated.

FIG. 9 shows a projection section 10b which is still another embodiment of the projection section 10 shown in FIG. 1. The projection section 10b comprises a light-emitting element 33 which outputs given light; an external modulator 32 which is disposed opposite the light exit surface of the light-emitting element 33 and indirectly modulates the light emanated from the light-emitting element 33 in accordance with the illumination light modulation signal S1; and an illumination optical system 30 which shapes the light output from the external modulator 32 and is directed toward the object. An electro-optical effect light modulator or an electro-acoustic effect modulator can be used as the external modulator 32. Light whose intensity is modulated arbitrarily and at high speed can be produced by indirect modulation of the given light 34 output from the light-emitting element 34, through use of the external modulator 32. The thus-produced light is shaped by the illumination optical system 30 so as to illuminate an object, whereby the illumination light S6 is produced. Like the projection section shown in FIG. 8, the projection section whose configuration is show in FIG. 9 can be used as means for controlling the intensity of illumination light under the three-dimensional information detecting method of the present invention.

Figure 10:
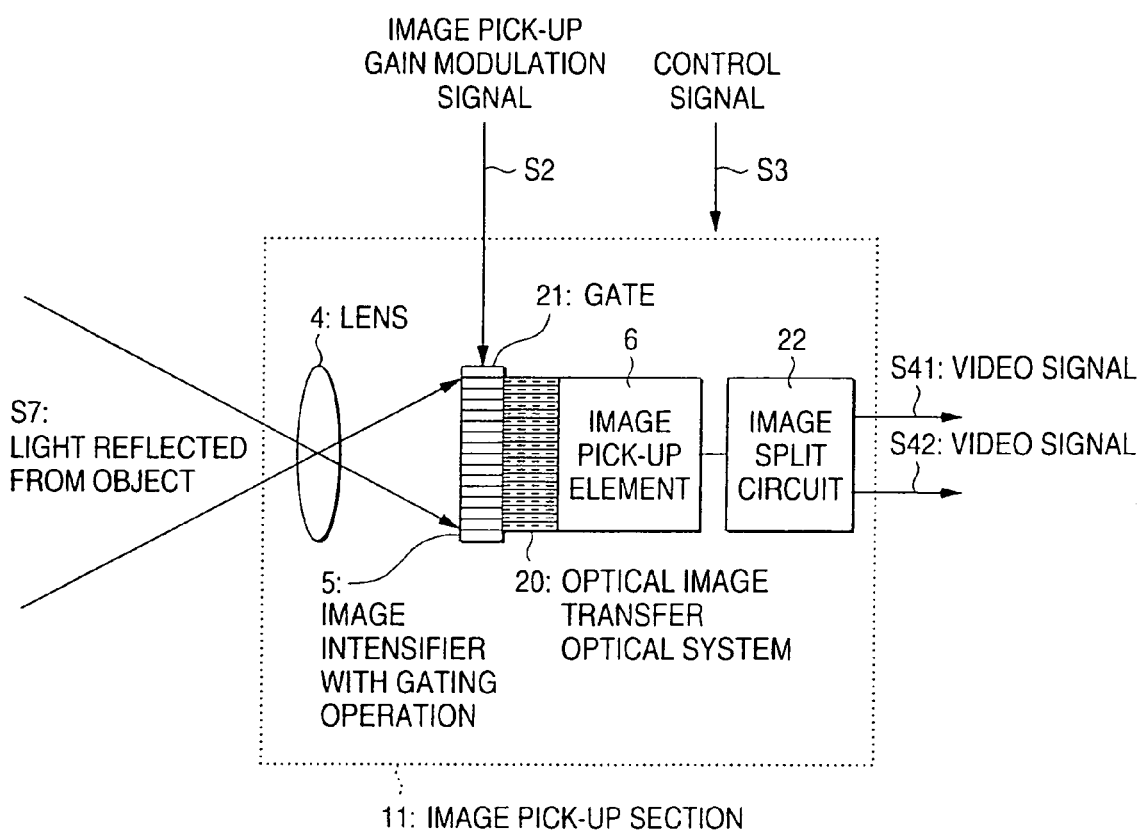
FIG. 10 is an illustration showing the configuration of an image pick-up section employing an image intensifier (II) with gating operation.

FIG. 10 shows an image pick-up section 11 which is another embodiment of the image pick-up section 11 shown in FIG. 1. The image pick-up section 11 comprises a lens 4 which receives light reflected from an object and produces an optical image, an image pick-up element 6 which is disposed behind the lens 4 and picks up the optical image output from the lens 4, and an image split circuit 22 which outputs a video signal pertaining to a plurality of screens included in the electric signal output from the image pick-up element 6 while the video signal is divided into respective screens. Further, an image intensifier with gating operation 5 capable of controlling the image pick-up gain in accordance with the image pick-up gain modulation signal S2, which is an electric signal, is attached to the front surface of the image pick-up element 6 via an optical image transfer optical system 20. A fiber plate or lens can be used as the optical image transfer optical system 20. Light S7 reflected from an object is formed on a photo-electric screen of the image intensifier with gating operation 5 by means of the lens 4. An optical image amplified by the image intensifier with gating operation 5 is transferred by the optical image transfer optical system 20 and input to the photo-electric screen of the image pick-up element 6.

The light amplification gain of the image intensifier with gating operation 5 can be controlled at high speed by means of a voltage to be applied to a gate 21 of the image intensifier with gating operation 5. In the image pick-up section 11, the image pick-up gain can be changed at high speed by application of the image pick-up gain modulation signal S2 to the gate 21. Accordingly, an image pick-up gain which is changed arbitrarily at high speed, such as a pulse-like image pick-up gain to be used for releasing a shutter for only a short period of time or an increment or decrement image pick-up gain, can be achieved.

In a case where the image pick-up section 11 is used in each of the previous embodiments, the image pick-up section 11 must acquire an image twice for calculating $R_+$, $R_-$, or R and output a video signal pertaining to two screens per frame while the signal is split. To this end, in the image pick-up section 11, the image pick-up element 6 is activated twice as fast as it is activated in normal times, to thereby acquire a video signal pertaining to two images. The video signal is output from the image split circuit 22 while being divided into a video signal S41 and a video signal S42. Alternatively, so long as there is employed an image pick-up element capable of acquiring an image for each pixel and at every image pick-up operation while effecting switching between the video signal S41 and the video signal S42, the video signals 41 and 42 can be output while they are split.

As mentioned above, the image pick-up section 11 whose configuration is shown in FIG. 10 can be used as means for controlling the image pick-up gain under the three-dimensional information detecting method of the present invention. Further, the image pick-up section 11 can also be used as means for outputting two video signals resulting from twice-acquisition of an image while being split.

Figure 11:
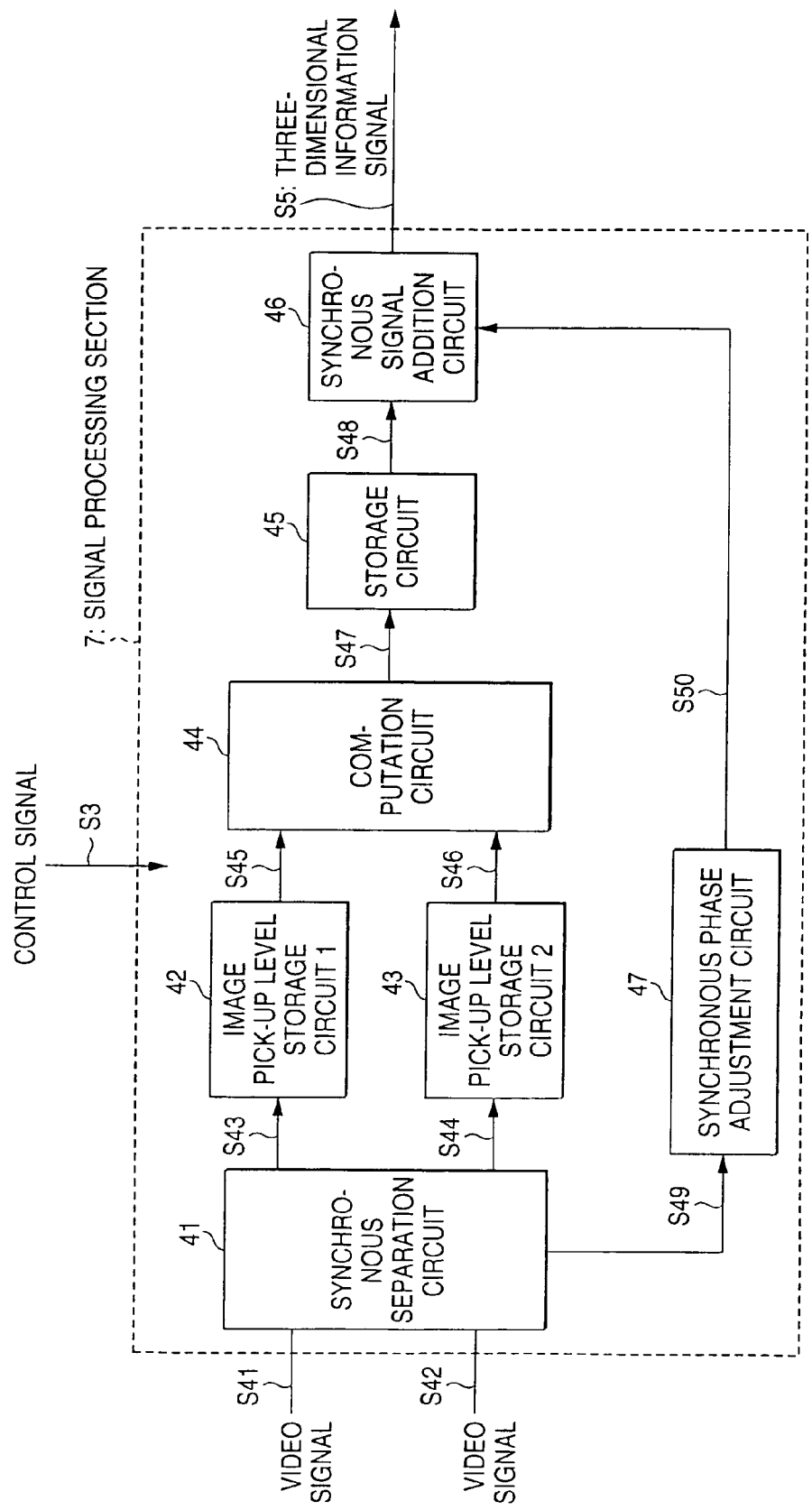
FIG. 11 is an illustration showing the configuration of a signal processing section.
Figure 12:
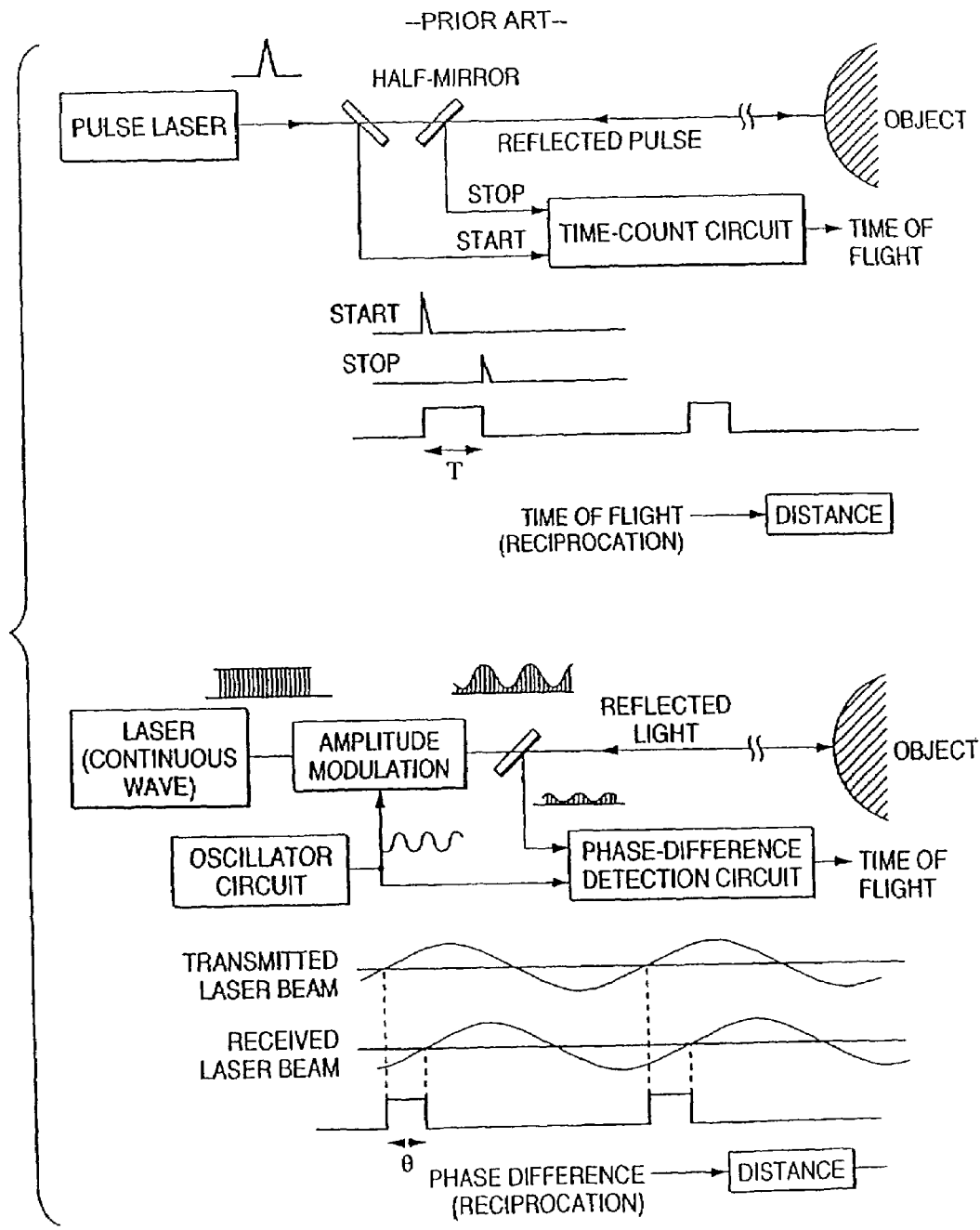
FIG. 12 is an illustration showing a conventional method of measuring the distance between an object and a three-dimensional information detecting device on the basis of a lag time or modulated phase of a reflected laser beam.
Figure 13:
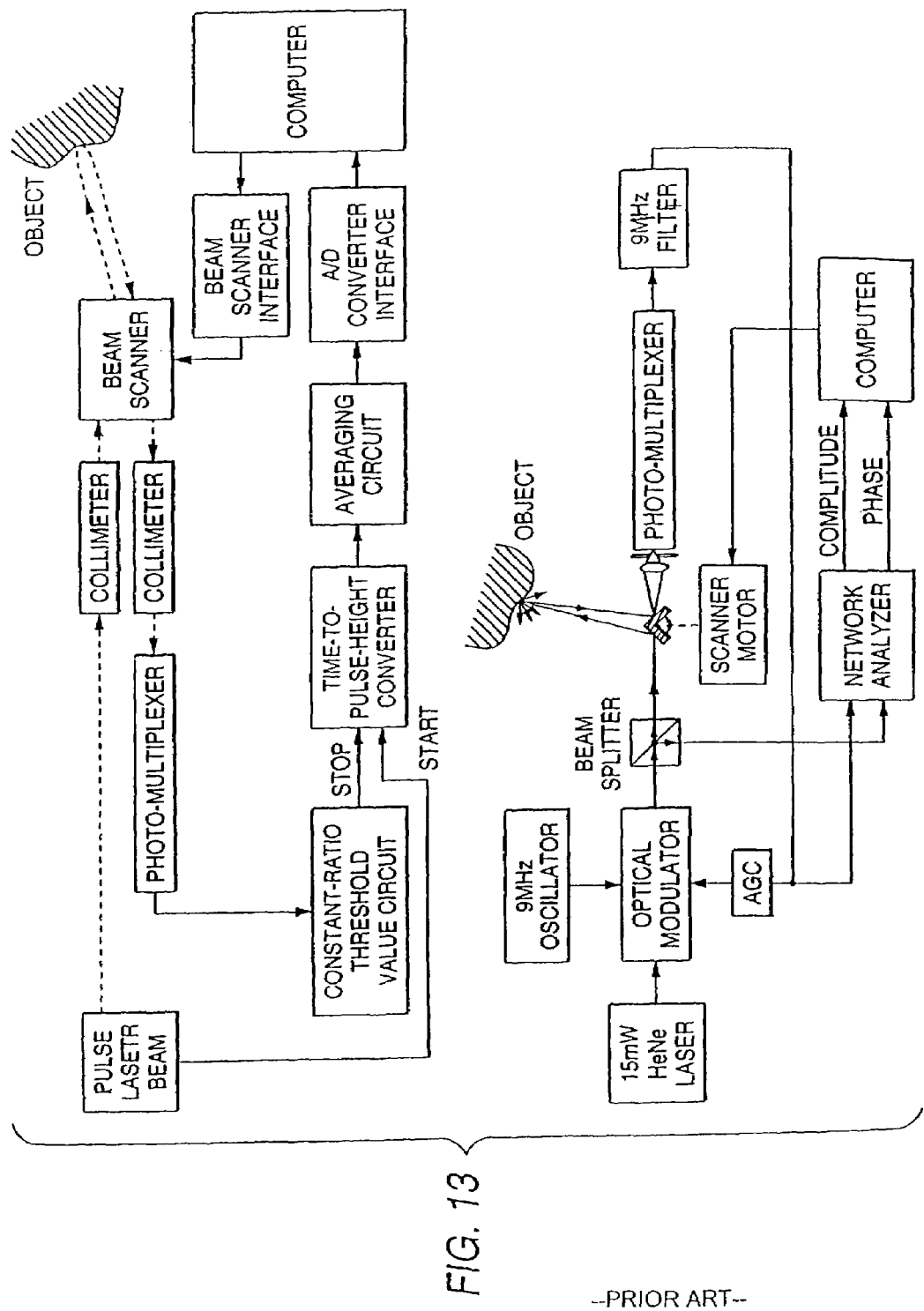
FIG. 13 is an illustration showing a conventional method of activating a laser beam so as to effect two-dimensional scanning.
Figure 14:
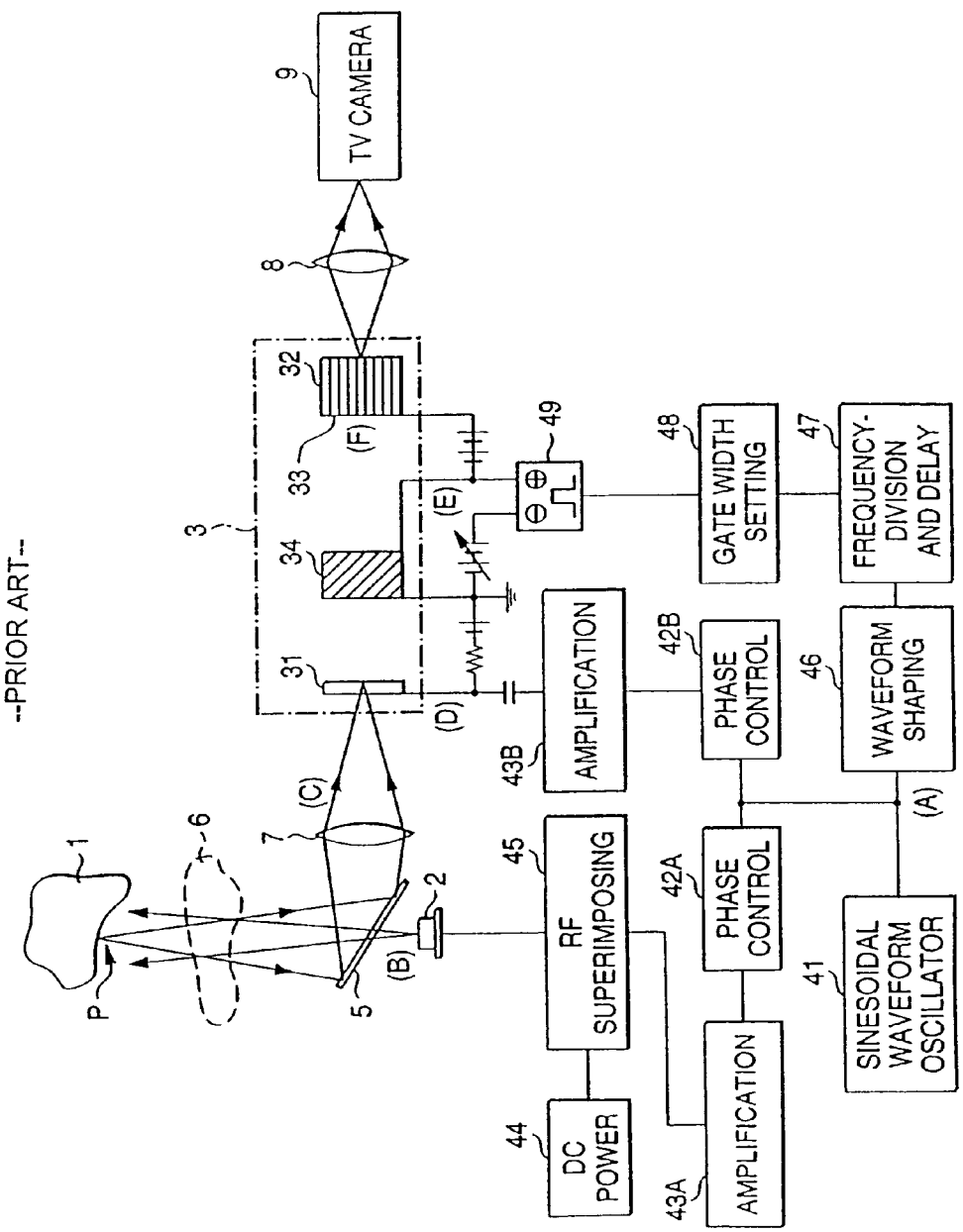
FIG. 14 is an illustration showing the configuration of a conventional imaging laser radar apparatus.

FIG. 11 shows a signal processing section 7 which is an embodiment of the signal processing section 7 shown in FIG. 1. In this signal processing section 7, an internal signal is driven at a rate—which is the same as the number of pixels of the video signal—and is subjected to pipe-line processing in individual circuits. After a synchronous signal has been eliminated from the video signals S41 in a synchronous signal separation circuit 41, the video signal S43 is stored in an image pick-up level storage circuit 1, and the video signal S44 is stored in an image pick-up level storage circuit 2. A signal S45 output from the image pick-up level storage circuit 1 and a signal S46 output from the image pick-up level storage circuit 2 are input to a computation circuit 44, where $R_+$, $R_-$, or R and the distance "d" are computed. A signal S47 output from the computation circuit 44 is a time-series signal resulting from two-dimensional scanning of the distance between the respective sections of the object. Time-axis fluctuations in the signal S47 are corrected by a storage circuit 45, and a synchronous signal is added to the thus-corrected signal b a synchronous signal addition circuit 46. The signal is output as a three-dimensional signal S5 whose video level corresponds to the value of information pertaining to the distance "d" between the respective points of the object. As mentioned above, the signal processing section 7 whose configuration is shown in FIG. 11 can be used as a means for computing three-dimensional information pertaining to an object in real time under the three-dimensional information detecting method of the present invention.

Advantageous Result of the Invention

As has been described in detail, the present invention enables two-dimensional determination of the distance between individual points of an object at a speed at which the three-dimensional information can be followed real time within a period of time corresponding to the frame of a video signal, as well as detection of three-dimensional information, by utilization of information pertaining to the intensity of an image of the object acquired under condition that either the intensity of illumination light or an image pick-up gain is changed with time. Consequently, the method and apparatus of the present invention can be suitably used for acquiring a three-dimensional motion picture of an object.

The invention claimed is:

1. A method of detecting three-dimensional information, comprising:
    illuminating an object sequentially with, a first illumination light which has a linearly varying intensity and a second illumination light which has a constant intensity;
    acquiring an image of the object illuminated by said two illumination lights such that a rate of change of an image pickup gain is faster than a rate of change of intensity of the first illumination light, wherein the image of the object is acquired at least two times, once during each illumination, and with a same pick-up gain during each illumination by an image pick-up element having storage effect; and
    detecting a distance between individual points of the object on the basis of the image obtained; wherein
    the distance between respective points of the object is detected at a speed at which three-dimensional image is output in real time, the three-dimensional image being output within a period of time corresponding to one normal image frame of a video signal being received by an image pickup device.

2. The method of detecting three-dimensional information as defined in claim 1, wherein
    a first and a second optical images of the object illuminated by the first and the second illumination light are formed;
    the first and the second optical images are obtained alternately by acquiring the first and the second optical images with a single image pick-up gain over a given period of time;
    the first and the second images obtained are stored; and
    the distance between respective points of the objects are detected by each of the first and second images and are detected sequentially for each frame of the video signal.

3. A method of detecting three-dimensional information, comprising:
    illuminating an object sequentially with a first illumination light which has a linearly varying intensity and a second illumination light which has a constant intensity;
    acquiring an image of the object illuminated by said two illumination lights by acquisition of the given level of a image pick-up gain such that a cycle of picking up images is shorter than a cycle of illumination changes, wherein the image of the object is acquired at least two times, once during each illumination, with a same pick-up gain during each illumination, by an image pick-up element having storage effect; and
    detecting a distance between individual points of the object on the basis of the image obtained; wherein
    the distance between respective points of the object is detected at a speed at which three-dimensional image is output in real time, the three-dimensional image being output within a period of time corresponding to one normal image frame of a video signal being received by an image pickup device.

4. The method of detecting three-dimensional information as defined in claim 3, wherein
    a first and a second optical images of the object illuminated by the first and the second illumination light are formed;
    the first and the second optical images are obtained alternately by acquiring the first and the second optical images with a single image pick-up gain over a given period of time;
    the first and the second images obtained are stored; and
    the distance between respective points of the objects are detected by each of the first and second images and are detected sequentially for each frame of the video signal.

5. A method of detecting three-dimensional information, comprising:
    illuminating an object sequentially with a first illumination light and a second illumination light, the second illumination light immediately following the first illumination light, both illumination lights having a linearly varying intensity;

acquiring an image of the object illuminated by at least two illumination lights by acquisition of a image pick-up gain having faster changing rate than a changing rate of the intensity of the illumination lights, wherein the image of the object is acquired a plurality of times by an image pick-up element having storage effect; and detecting a distance between individual points of the object on the basis of the image obtained; wherein the distance between respective points is detected at a speed at which three-dimensional image is output in real time, the three-dimensional image being output within a period of time corresponding to one normal image frame of a video signal being received by an image pickup device.

6. The method of detecting three-dimensional information as defined in claim 5, wherein the intensity of the first illumination light is increased with time, and the second illumination light is decreased with time.

7. A method of detecting three-dimensional information, comprising:

illuminating an object sequentially with at least a first illumination light and a second illumination light, the second illumination light immediately following the first illumination light, both illumination lights having a linearly varying intensity;

acquiring an image of the object illuminated by said at least two illumination light by acquisition of the given level of a pick-up gain with shorter changing cycle than a changing cycle of the intensity of the illumination light, wherein the image of the object is acquired a plurality of times by an image pick-up element having storage effect; and detecting a distance between individual points of the object on the basis of the image obtained; wherein the distance between respective points of the object is detected at a speed at which three-dimensional image is output in real time, the three-dimensional image being output within a period of time corresponding to one normal image frame of a video signal being received by an image pickup device.

8. The method of detecting three-dimensional information as defined in claim 7, wherein the intensity of the first illumination light is increased with time, and the second illumination light is decreased with time.

* * * * *